US007537037B2

(12) United States Patent
Morton

(10) Patent No.: US 7,537,037 B2
(45) Date of Patent: May 26, 2009

(54) DRYWALL TAPE AND JOINT COMPOUND DISPENSER

(76) Inventor: Ronald James Morton, P.O. Box 42, Sulphur Springs, OH (US) 44881

( * ) Notice: Subject to any disclaimer, the term of this patent is extended or adjusted under 35 U.S.C. 154(b) by 642 days.

(21) Appl. No.: 11/190,298

(22) Filed: Jul. 27, 2005

(65) Prior Publication Data

US 2007/0034150 A1 Feb. 15, 2007

(51) Int. Cl.
*B32B 38/04* (2006.01)

(52) U.S. Cl. ....................... 156/525; 156/527; 156/575; 156/577

(58) Field of Classification Search ................. 156/574, 156/575, 577, 578, 525, 526, 527; 118/404, 118/405, 429
See application file for complete search history.

(56) References Cited

U.S. PATENT DOCUMENTS 2,319,639 A * 5/1943 Simpson ..................... 118/405
2,499,017 A * 2/1950 Callaway et al. .............. 118/43
2,570,379 A * 10/1951 Robinson .................... 118/405
2,843,083 A * 7/1958 Epling ........................ 118/413
3,326,738 A * 6/1967 McLaughlin ................ 425/182
4,406,730 A 9/1983 Altmix
4,757,783 A 7/1988 Matheny
4,996,941 A * 3/1991 Mills .......................... 118/419
5,040,483 A * 8/1991 Lieberman .................. 118/419
5,498,287 A * 3/1996 Barnfield ..................... 118/43
5,676,793 A * 10/1997 Martin et al. ............... 156/578
5,736,001 A 4/1998 Samuelson
5,814,184 A 9/1998 Denkins
6,367,534 B1 4/2002 McGlenn
6,454,124 B1 * 9/2002 Edwards et al. ............. 220/636
6,648,165 B1 * 11/2003 Accardo ..................... 220/507
6,668,897 B2 12/2003 Gunn
2005/0092441 A1 * 5/2005 Pfefferkorn ................. 156/574
2008/0066872 A1 * 3/2008 Rose .......................... 156/574

* cited by examiner

*Primary Examiner*—Mark A Osele
(74) *Attorney, Agent, or Firm*—Renner, Otto, Boisselle & Sklar, LLP

(57) ABSTRACT

A stackable drywall tape and joint compound dispenser is disclosed. The dispenser includes a tape holder and a reservoir for storing drywall joint compound, wherein when the dispenser is placed on another dispenser of substantially the same configuration, at least one of the respective tape holders and reservoirs nest with one another.

25 Claims, 13 Drawing Sheets

DRYWALL TAPE AND JOINT COMPOUND DISPENSER

FIELD OF THE INVENTION

The invention relates to a drywall or wallboard tape and joint compound dispenser. More specifically, the invention relates to a tool used in applying joint compound to drywall tape.

BACKGROUND OF THE INVENTION

The joints formed between adjoining drywall or wallboard panels are generally covered with a lamination of joint compound and fibrous drywall tape to hide the cracks defined by and between the abutting panels. Joint compound and tape are typically applied manually by trowel or by a pressurized hand-operated tape and compound applicator to lay down a thin layer of compound and tape over each joint. The compound is typically applied only to that side of the tape which faces the wallboard panel.

Once the initial layer or coat of joint compound and tape is applied, it is smoothed over with a tool, such as a taping knife or trowel, and allowed to dry overnight. A relatively narrow and thin coating of joint compound is subsequently applied over the initial lamination of joint compound and tape using a trowel or a pressurized joint compound applicator. This second operation covers the exposed or outer side of the drywall tape and sandwiches the tape between the first layer of joint compound and the newly applied layer.

This second layer of joint compound is then allowed to dry. After it dries, a third wider layer of joint compound is then applied over the second layer. Sanding is then required to smooth over the joint.

Numerous dispensers have been developed for applying a substance to a strip of material prior to application of the strip to another surface, including drywall joint compound dispensers which apply compound to the tape prior to application of the tape on the seams of wallboards. Examples of these prior art dispensers are shown in U.S. Pat. Nos. 3,496,909; 3,513,809; 3,381,661; 3,292,575; 4,067,294; 1,935,060; 2,717,575; 2,679,232; 2,779,307; and 4,159,695.

Although these known prior art dispensers serve their intended purposes, including providing solutions to many problems experienced in drywall installation, most of these dispensers are complicated devices which are expensive to manufacture and are time-consuming and expensive to maintain in proper working condition since they include moving parts subject to wear which ultimately require repair or replacement. Further, such dispensers typically are bulky and, thus, occupy significant space as they are stored and/or transported.

SUMMARY OF THE INVENTION

The present invention provides a drywall tape dispenser that can be stacked, wherein when stacked, the dispensers nest with one another so as to enable one to store multiple dispensers in a compact space. Further, the dispenser can be easily cleaned, and simple to manufacture.

According to an aspect of the invention, there is provided a stackable drywall tape and joint compound dispenser that includes a tape holder and a reservoir for storing drywall joint compound. The dispenser can be configured such that when the dispenser is placed on another dispenser of substantially the same configuration, at least one of the respective tape holders and/or reservoirs of each dispenser nest with one another.

Preferably, at least one of the tape holder and reservoir are tapered such that an upper region of the tape holder or reservoir is wider than a lower region the tape holder or reservoir. The tape holder and/or reservoir can be formed in a V-shape, such that an angle formed between a floor of the tape holder (and/or reservoir) and a wall of the respective tape holder (and/or reservoir) is obtuse.

More particularly, a configuration of the tape holder can be different from a configuration of the reservoir. Additionally, the tape holder and reservoir can be formed having rectilinear or curvilinear shapes.

Yet more particularly, the reservoir can include an input port for receiving drywall tape, and an output port for dispensing drywall tape coated with joint compound. At least one of the input port and the output port can be formed so as to inhibit leakage of joint compound from the reservoir. Leakage from the input port and/or output port can be inhibited by forming the respective ports to follow a contour of the reservoir.

More particularly, the dispenser can be a multi-piece dispenser or single piece dispenser. Further, the dispenser can be configured with no moving parts, and/or can include a channel that guides the drywall tape through a pre-determined path within the dispenser.

Yet more particularly, the dispenser can include a cutting edge, such as a sharp or serrated edge, for cutting the drywall tape. Further, the dispenser can include a selectively retractable platform coupled to the dispenser. The platform can be coupled to the dispenser via a hinge, such as a rotatable or elastic hinge, and the platform can be detachable from the dispenser.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed.

DETAILED DESCRIPTION

Figure 1:
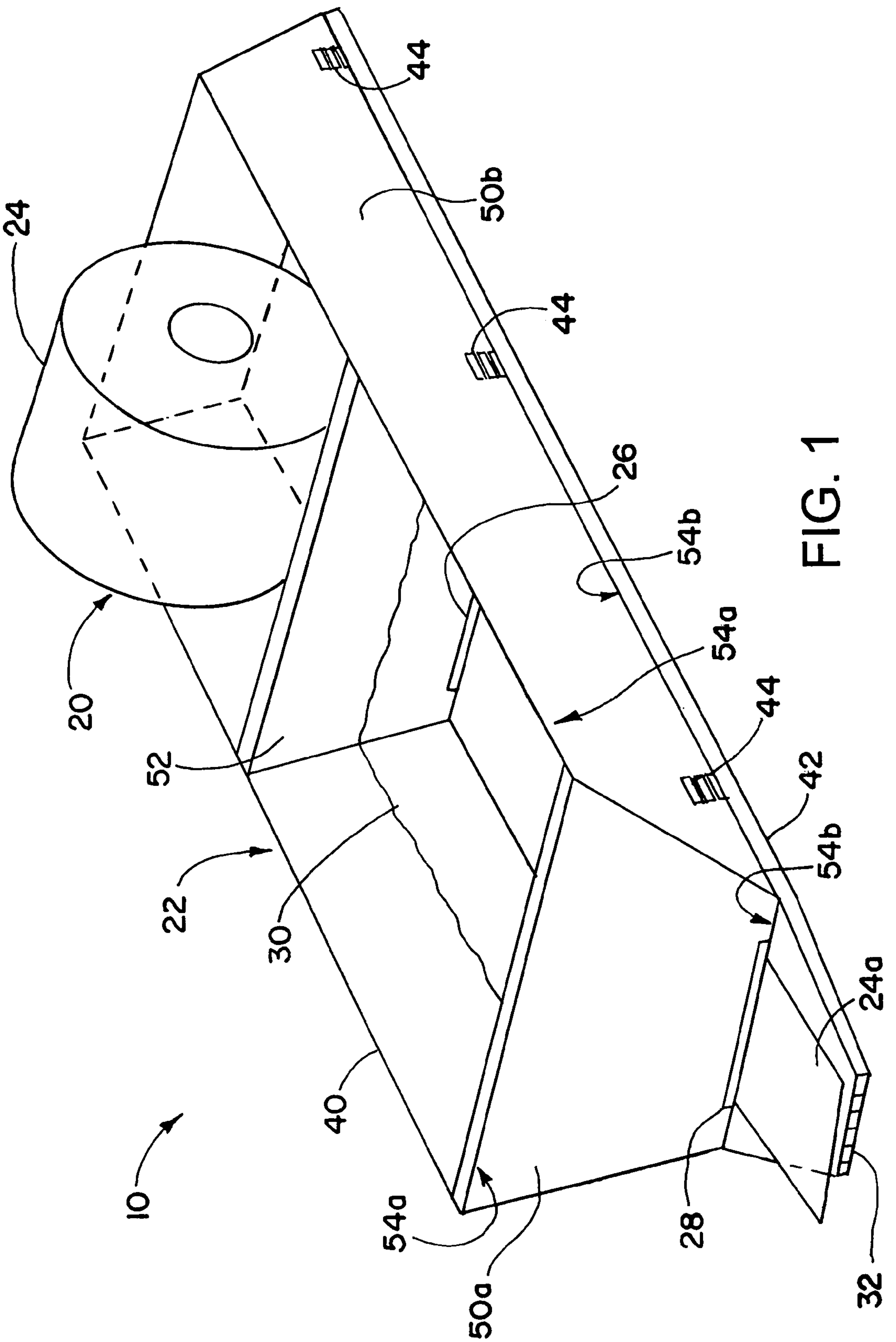
FIG. 1 is a perspective view of a drywall tape and joint compound dispenser in accordance with a first embodiment of the invention.
Figure 2A:
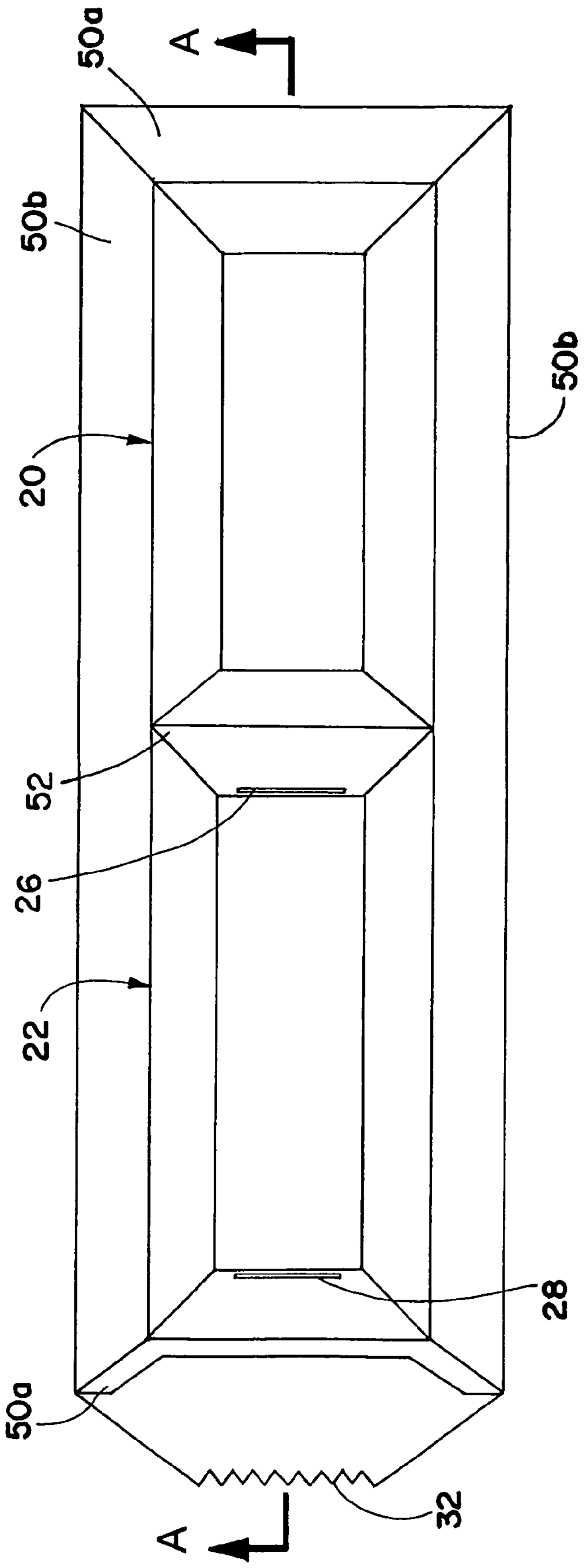
FIGS. 2A-2D are top, side, front and back views, respectively, of the dispenser of FIG. 1.
Figure 2B:
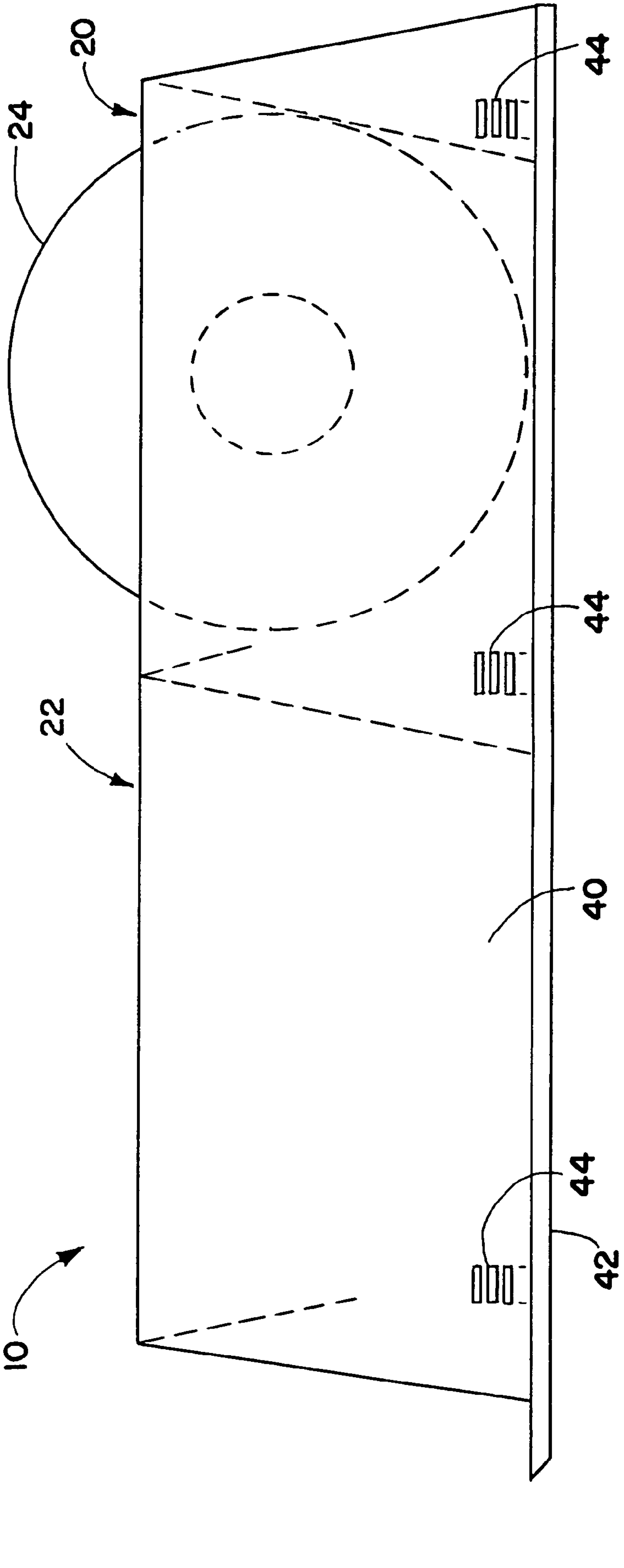
Figure 2C:
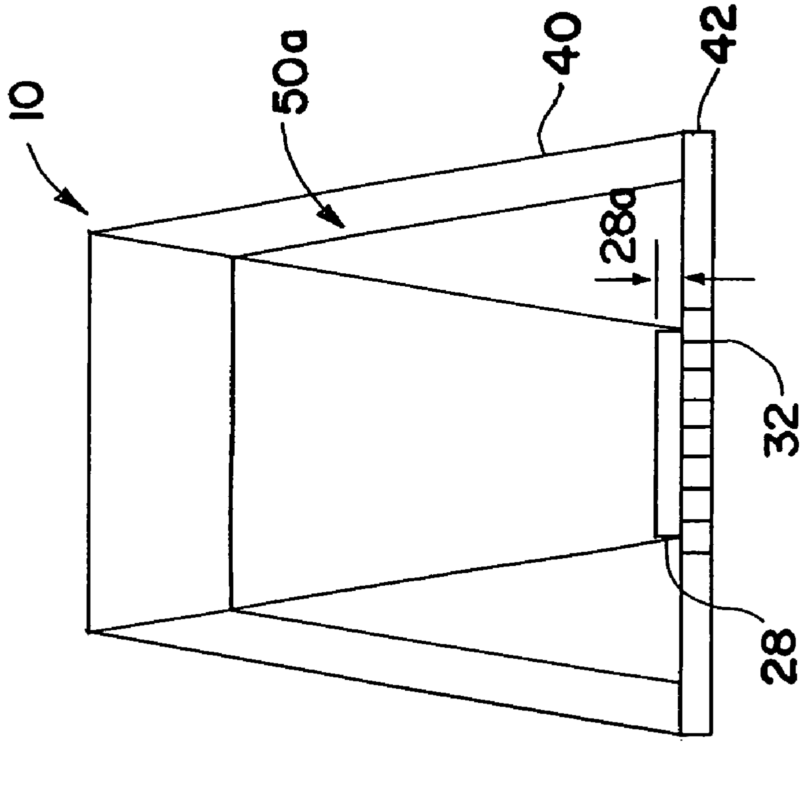
Figure 2D:
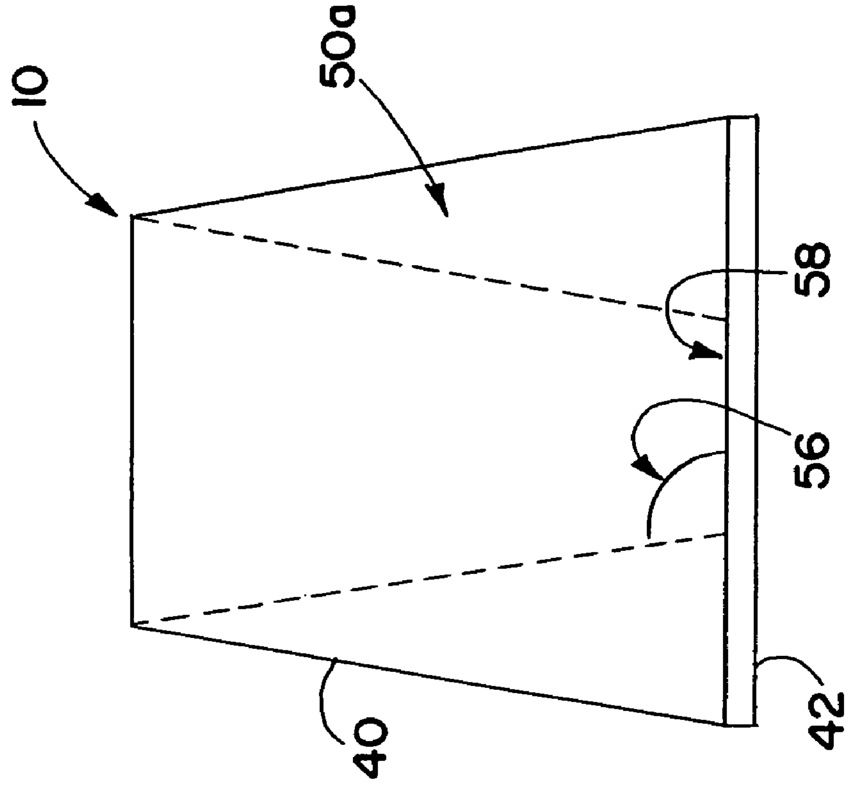

In the detailed description that follows, corresponding components have been given the same reference numerals, regardless of whether they are shown in different embodiments of the present invention. To illustrate the present invention in a clear and concise manner, the drawings may not necessarily be to scale.

Figure 3:
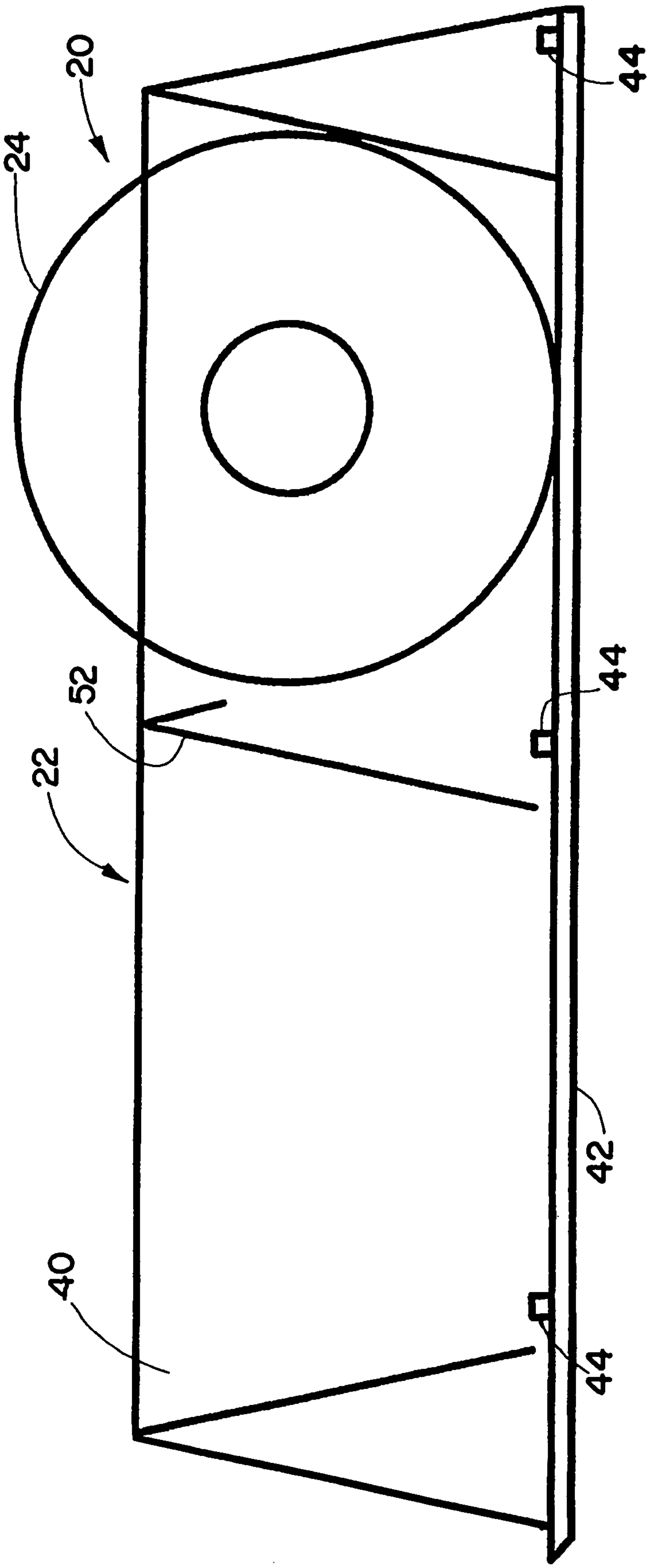
FIG. 3 is a sectional view of the dispenser of FIG. 1.

The present invention will now be described in conjunction with the drawings. Referring initially to FIG. 1, there is provided a perspective view of a drywall tape dispenser 10 in accordance with a first embodiment of the invention. FIGS. 2A-2D illustrate top, side, front and back views, respectively, of the dispenser 10, while FIG. 3 is a cross section of the dispenser 10 taken along section A-A The dispenser 10 includes a tape holder 20 and a reservoir 22. Drywall tape 24, such as a roll of drywall tape, is placed in the tape holder 20 of the dispenser 10 and the tape is threaded through a first elongated guide slot 26, which, via a channel 27 (FIG. 6A), connects the tape holder 20 to the reservoir 22. The drywall tape 24 also is threaded through a second elongated guide slot 28, from which the drywall tape 24 exits the dispenser 10. Drywall joint compound or "mud" 30 having a desired consistency then is placed in the reservoir 22 at a level above the drywall tape 24, thereby covering the drywall tape 24.

As the drywall tape 24 is extracted from the dispenser 10, the tape 24, via the first elongated guide slot 26 and channel 27 (FIG. 6A), passes from the tape holder 20 into the mud filled reservoir 22, thereby becoming coated with a layer of mud 30. The tape 24 is extracted from the reservoir 22 via the second elongated guide slot 28 and can be cut as needed while leaving a free end of drywall tape 24*a* outside the dispenser 10. The free end 24*a* facilitates grasping and pulling more drywall tape 24 from the dispenser 10. A cutting edge 32, such as a sharp or serrated edge, for example, can be used to cut or tear the drywall tape 24 to a desired length. The mud coated tape 24 then can be applied to wallboard panels and, if necessary, the tape and compound can be flattened against each wallboard panel with a putty knife or trowel.

As used herein, a reservoir is to be construed broadly, and includes a basin, a trough, a container, or the like, that can hold an object or substance in solid, semi-solid, or liquid form. A reservoir, as used herein, is not limited to a long and narrow shape as shown in the figures, but can be any shape, including rectilinear shapes, e.g., a frustrum, a wedge, etc., and curvilinear shapes, e.g., a sphere segment, one half of a right circular cylinder, etc., that facilitates dispensing mud 30 and/or drywall tape 24.

The dispenser 10 can be a multi-piece unit having a body 40 and a detachable base 42. Selectively operable retainers 44, such as clips or the like, may hold the base 42 to the body 40. The selectively operable retainers 44 also allow the base 42 to be positioned in one of a plurality of different orientations with respect to the body 40. By adjusting the position of the base 42 with respect to the body, a height 28*a* of the second elongated slot 28 can also be adjusted. This is advantageous in that it permits an amount of mud 30 deposited on the extracted tape 24 to be set or controlled. If more mud is desired on the tape, the base 42, via the selectively operable retainers 44, can be adjusted to increase an overall height 28*a* of the second guide slot 28. Alternatively, if less mud 30 is desired on the extracted tape 24, the base 42 can be adjusted to decrease the overall height 28*a* of the second guide slot 28.

In another embodiment, the base 42 can have a tapered or sloped surface in the region of the elongated slot 28. The slope of the base 42 can be used to adjust the amount of mud deposited on the tape simply by positioning the base further forward or backward with respect to the body 40. For example, the slope can increase along the base 42, with a low portion being near the cutting edge 32 and a higher portion away from the cutting edge 32. If less mud is desired on the tape 24, the base 42 can be moved forward with respect to the body 40 such that the height 28*a* of the elongated slot 28 is reduced. Conversely, if additional mud is desired on the tape 24, the base 42 can be moved backward with respect to the body 40 such that the height 28*a* of the elongated slot 28 is increased. As will be appreciated, the base and/or body can be provided with a number of selectively operable retainers 44 at various locations such that the base 42 can be secured to the body 40 in any one of a number of locations.

Further, the detachable base 42 facilitates cleaning of the dispenser 10. Moreover, and as will be discussed in more detail below, once the base 42 is detached from the body 40, multiple bodies 40 can be stacked together such that the bodies 40 nest with one another. This is particularly advantageous for shipping and/or stocking the dispenser 10 in retail stores, as significantly less space is occupied when the bodies are nested. Multiple bases 42 also may be stacked on one another.

Figure 4:
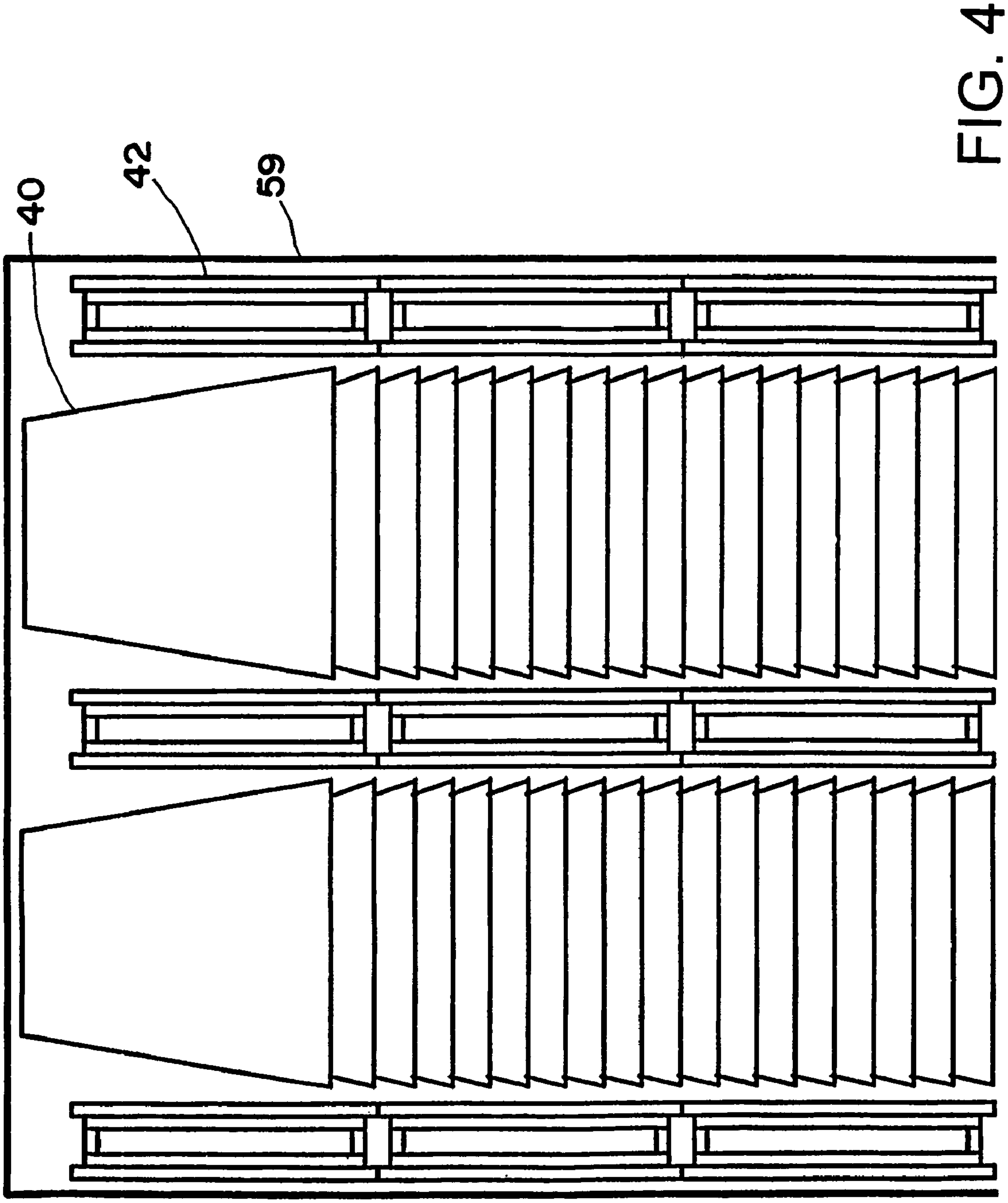
FIG. 4 is an exemplary shipping container that includes multiple dispensers, wherein the dispensers are stacked on one another in a nesting configuration.

The body 40 includes end walls 50*a* and sidewalls 50*b* (collectively referred to as walls), which, in conjunction with a divider wall 52, define the walls of the tape holder 20 and the reservoir 22. The walls 50*a*, 50*b* and the divider wall 52 are tapered such that top regions 54*a* of the tape holder 20 and/or reservoir 22 are wider than bottom regions 54*b* of the tape holder and/or reservoir. For example, an angle 56 (FIG. 2D) formed between a floor 58 of the tape holder 22, e.g., the base 42 as the base is attached to the body 40, (or reservoir) and the walls of the tape holder (or reservoir) is obtuse, such that opposing walls form a V-shape. The taper facilitates nesting of multiple bodies 40, wherein as the bodies are stacked, walls 50*a*, 50*b*, 52 that define each tape holder and reservoir of the dispenser 10 nest with walls 50*a*, 50*b*, 52 that define the tape holder and reservoir of an adjacent dispenser 10. Referring briefly to FIG. 4, there is shown an exemplary shipping container 59 that includes a plurality of bodies 40 stacked on top of one another, wherein each body 40 nests with an adjacent body 40 as they are stacked. Also shown are a plurality of bases 42 stacked on one another.

Figure 5A:
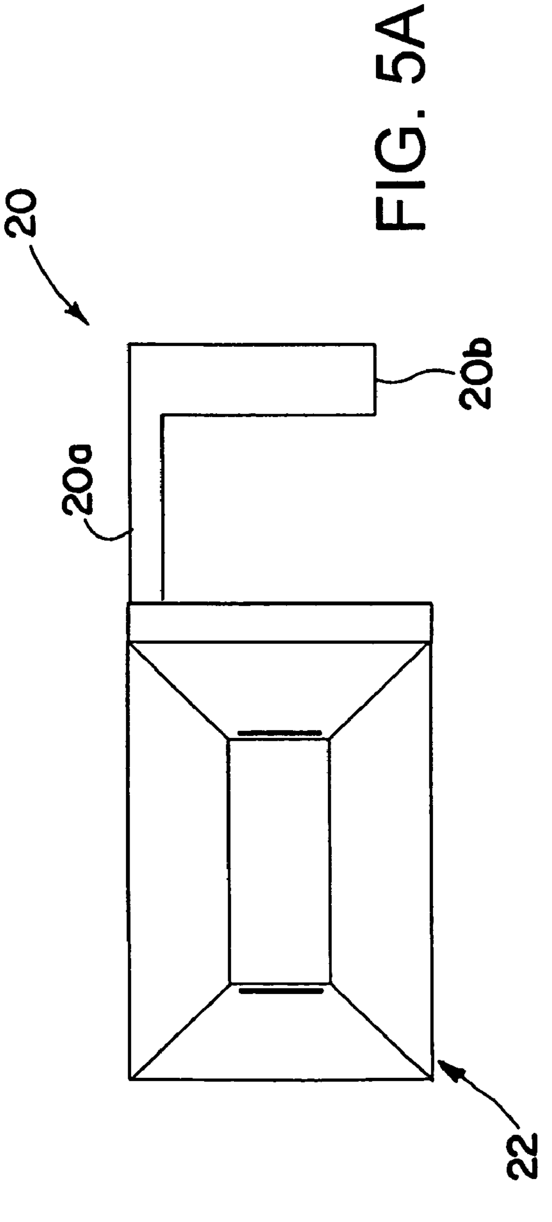
FIGS. 5A and 5B illustrate an alternative tape holder in accordance with an embodiment of the invention.
Figure 5B:
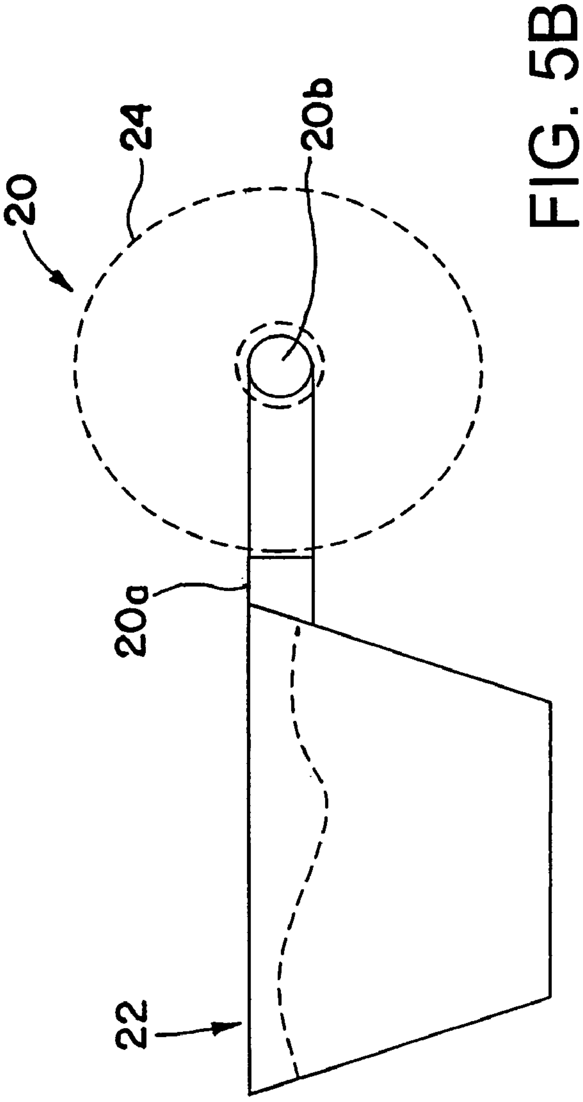

While the dispenser 10 is shown as having a tape holder 20 and reservoir 22 that are substantially equal in shape and size, it will be appreciated that the tape holder and reservoir may have different dimensions and/or different configurations from one another. For example, the reservoir 22 may be larger than the tape holder 20, thereby accommodating a larger volume of mud. Alternatively, the tape holder 20 may have a curvilinear shape, while the reservoir 22 may have a rectilinear shape. Further, the tape holder 20 may be formed having a structure significantly different from the reservoir 22. For example, and referring briefly to FIGS. 5A and 5B, the tape holder 20 can include an arm 20*a* having a spool or roll 20*b* for accepting the drywall tape 24. The arm 20*a* can be attached to the dispenser 10 via a hinge, swivel, or the like (not shown), such that the arm 20*a* can be moved to a location appropriate for storage and/or shipping.

Figure 6C:
FIGS. 6A-6C are top, side and back views of the base of the dispenser of FIG. 1.
Figure 6A:
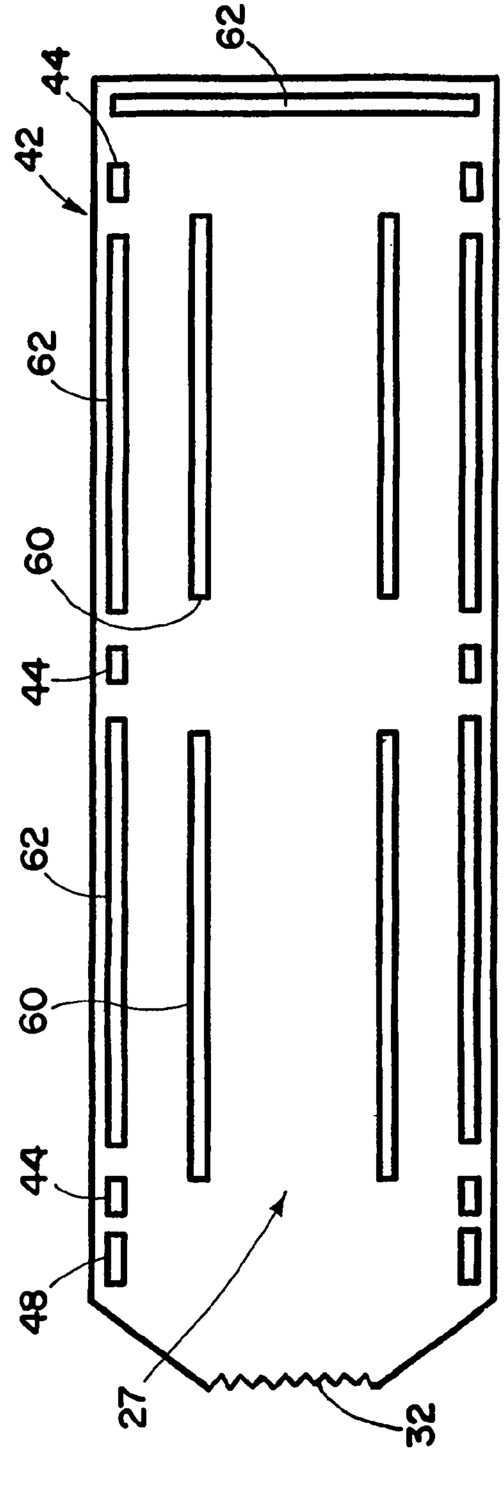
Figure 6B:
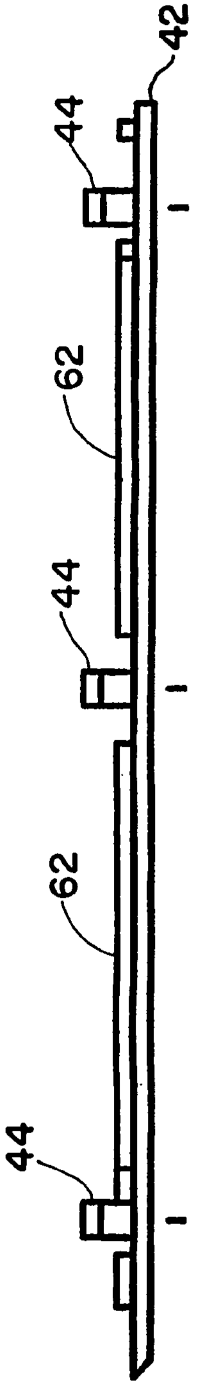

With further reference to FIGS. 6A-6C, the base 42 can be a rectangular base (or any shape that conforms to a desired shape of the tape holder and/or reservoir) formed from metal, plastic, or other suitable materials. The base 42 can include elongated ridges 60 that form the channel 27, which tends to maintain the drywall tape 24 in a desired location. For example, the channel 27 can maintain the tape in a center region of the tape holder and reservoir as the tape is drawn through the dispenser 10. The base 42 can further include assembly guides 62, which facilitate alignment of the base 42 to the body 40 as the base and body are attached and/or detached from one another. The assembly guides 62 can be elongated segments that extend above a surface of the base 42 and interface with body 40 so as to guide and/or improve the rigidity of the overall dispenser 10.

Accordingly, a drywall tape dispenser according to the first embodiment of the present invention enables one to stack the dispenser bodies 40 such that the bodies nest with one another. Further, the base 42 can be easily removed from the body 40, thereby facilitating cleaning of the dispenser.

Figure 7:
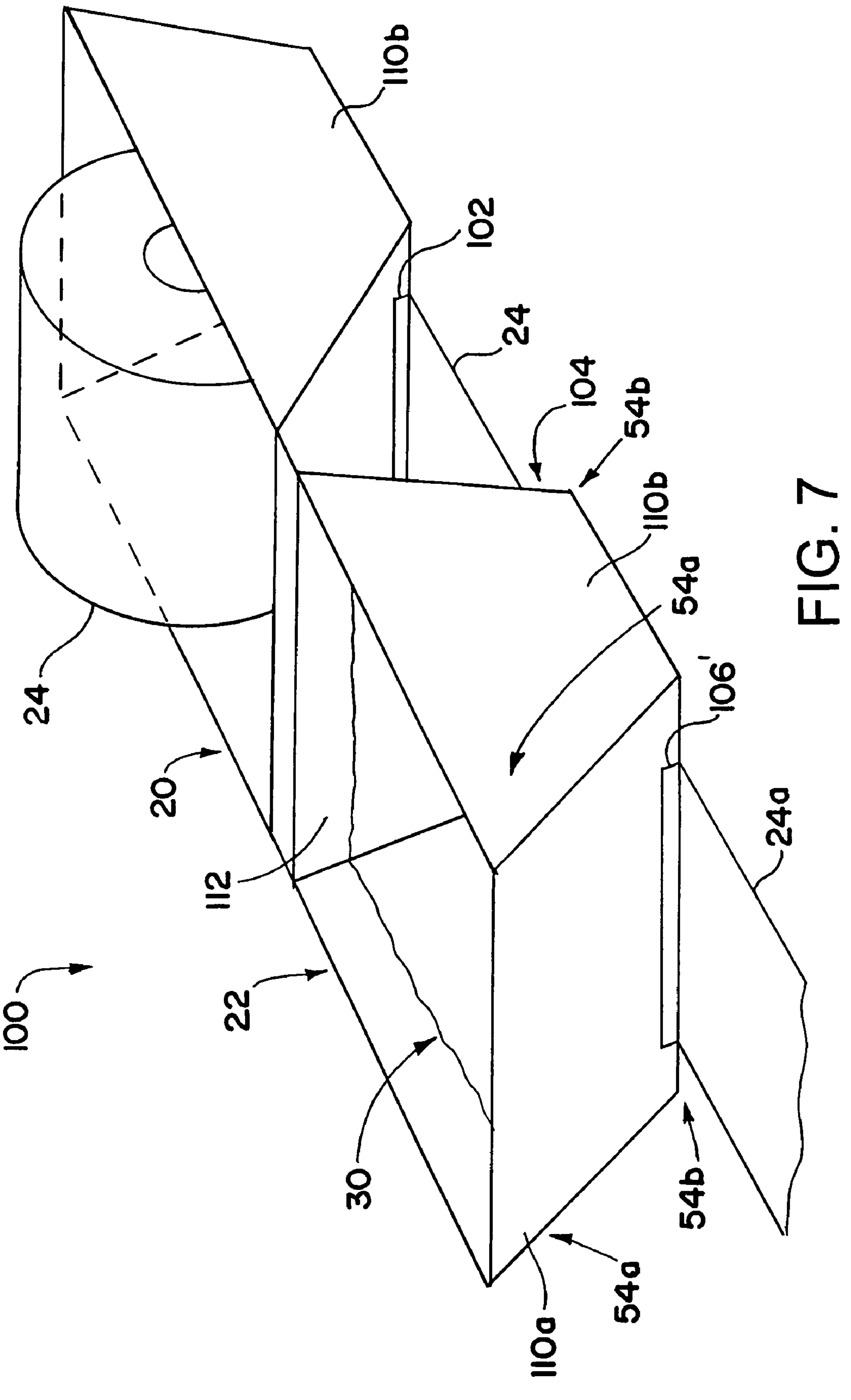
FIG. 7 is a perspective view of a drywall tape and joint compound dispenser in accordance with a second embodiment of the invention.
Figure 8A:
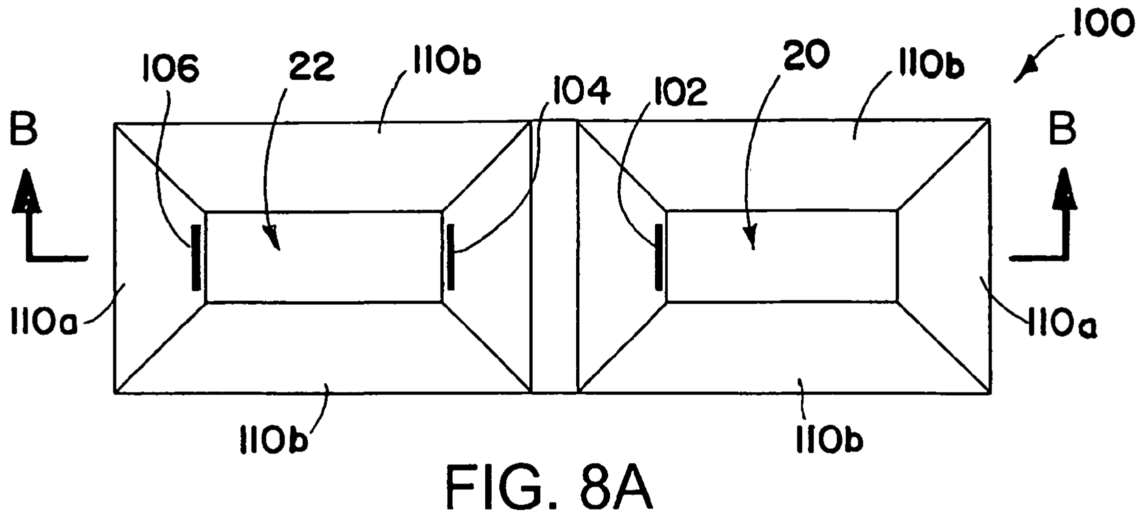
FIGS. 8A-8D are top, side, front and back views, respectively, of the dispenser of FIG. 7.
Figure 8B:
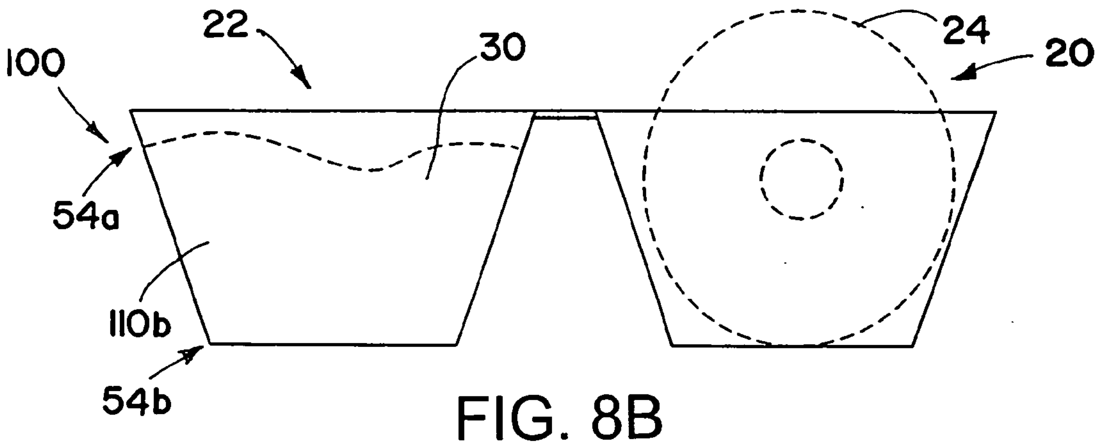
Figure 8C:
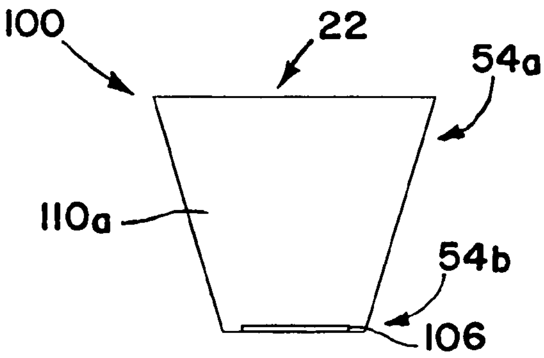
Figure 8D:
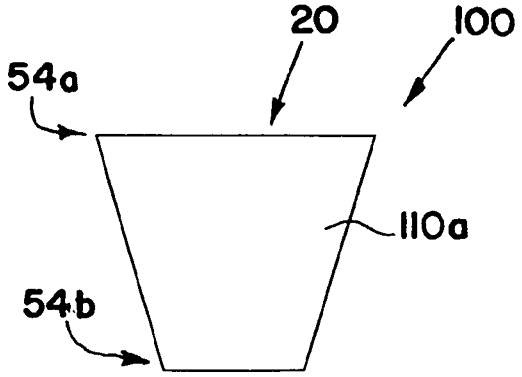
Figure 9:
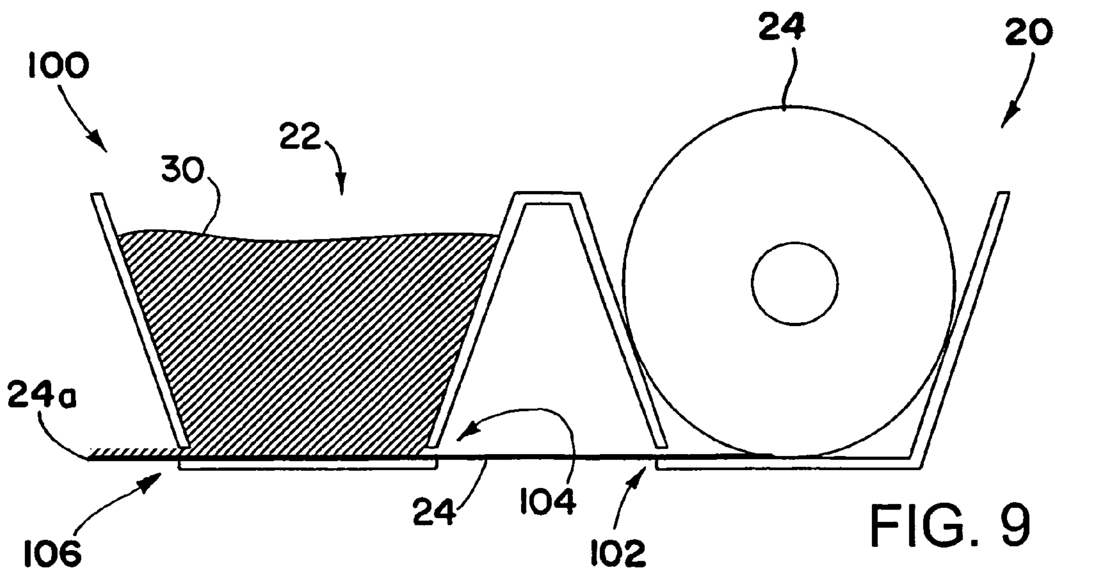
FIG. 9 is a sectional view of the dispenser of FIG. 7.

Referring now to FIG. 7, there is provided a perspective view of a dispenser 100 in accordance with a second embodiment of the invention. FIGS. 8A-8D illustrate top, side, front and back views, respectively, of the dispenser 100, while FIG. 9 illustrates a cross section of the dispenser taken along section B-B. The dispenser 100 is a one-piece unit having no detachable or moving parts, and includes a tape holder 20 and a reservoir 22. Drywall tape 24 is placed in the tape holder 20 and the tape is threaded through a first elongated guide slot 102, which guides the tape out of the tape holder 20. The drywall tape then is threaded into a second elongated guide slot 104, which guides the drywall tape 24 into the reservoir 22, and a third elongated guide slot 106, from which the drywall tape 24 exits the dispenser 100. Mud 30 having a desired consistency then can be placed in the reservoir 22 at a level above the drywall tape 24, thereby covering the drywall tape 24.

Like the previous embodiment, as the drywall tape 24 is extracted from the dispenser 100, the tape 24, via the first, second and third elongated guide slots 102, 104 106, passes from the tape holder 20 to the mud filled reservoir 22 and out of the dispenser 100, thereby becoming coated with a layer of mud 30. The coated drywall tape 24 can be torn or cut as needed while leaving a free end of drywall tape 24*a* outside the dispenser 100. This free end 24*a* then is available for grasping and pulling more drywall tape 24 from the dispenser 100 at a later time. The coated tape 24 then can be applied to wallboard panels as described previously.

Figure 10:
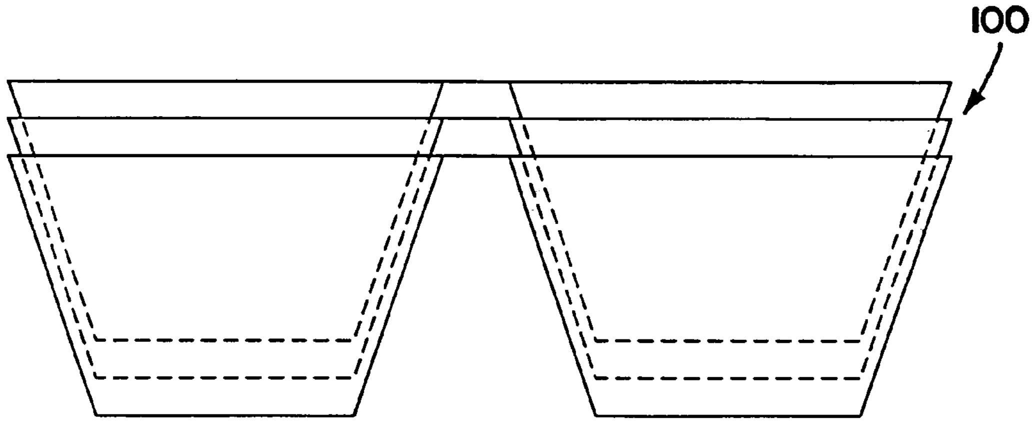
FIG. 10 illustrates dispensers according to FIG. 7 stacked on one another in a nesting configuration.

The dispenser 100 includes end walls 110*a* and sidewalls 110*b* (collectively referred to as walls), which, in conjunction with a divider wall 112, define the walls of the tape holder 20 and the reservoir 22. The walls 110*a*, 110*b*, and the divider wall 112 are tapered such that top regions 54*a* of the tape holder 20 and reservoir 22 are wider than bottom regions 54*b* of the tape holder and reservoir. The wall taper facilitates nesting of multiple dispensers 100, wherein as the dispensers are stacked, the tape holder 22 and reservoir 20 of each dispenser 100 nest with the tape holder and reservoir of adjacent dispensers. Nesting of the dispensers 100 is illustrated in FIG. 10.

Depending on the consistency of the mud placed in the reservoir 22, it may be possible for some mud to "leak" from the second and third elongated slots 104, 106 of the dispenser 100. To minimize or prevent leakage from the respective slots 104, 106, the slots may include extensions that follow a contour of the reservoir 22, wherein an entry point (or exit point) for the elongated slot is placed at a level likely to be higher than a level of mud in the reservoir 22.

Figure 11:
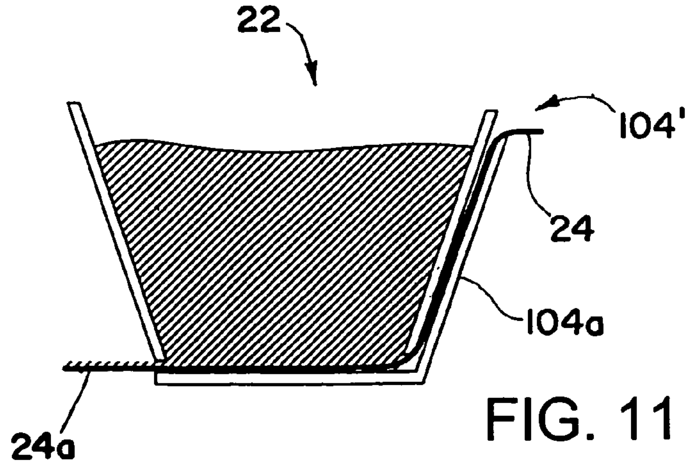
FIG. 11 illustrates an alternative tape path into the reservoir in accordance with an embodiment of the invention.

FIG. 11 illustrates this concept applied to the second elongated slot 104'. More specifically, the second elongated slot 104' includes an extension 104*a* that follows the contour of the reservoir 22. Any mud that may leak into the second elongated slot 104' will be contained by the extension 104*a*. To accommodate the alternative entry path to the second elongated slot 104', the location of the first elongated slot 102 may be repositioned so as to provide a path to the second elongated slot that minimizes bending of the tape 24. For example, the first elongated slot 102 can be placed in an upper region of the tape holder 20 at substantially the same height as the second elongated slot 104'. Although not shown, it will be appreciated that the extension can be applied to the third elongated slot 106.

Accordingly, a drywall tape dispenser 100 according to the second embodiment of the invention can be formed as a one-piece unit and with no moving parts. Moreover, the dispenser 100 can be stacked one on top of another, wherein adjacent dispensers nest with one another.

Figure 12A:
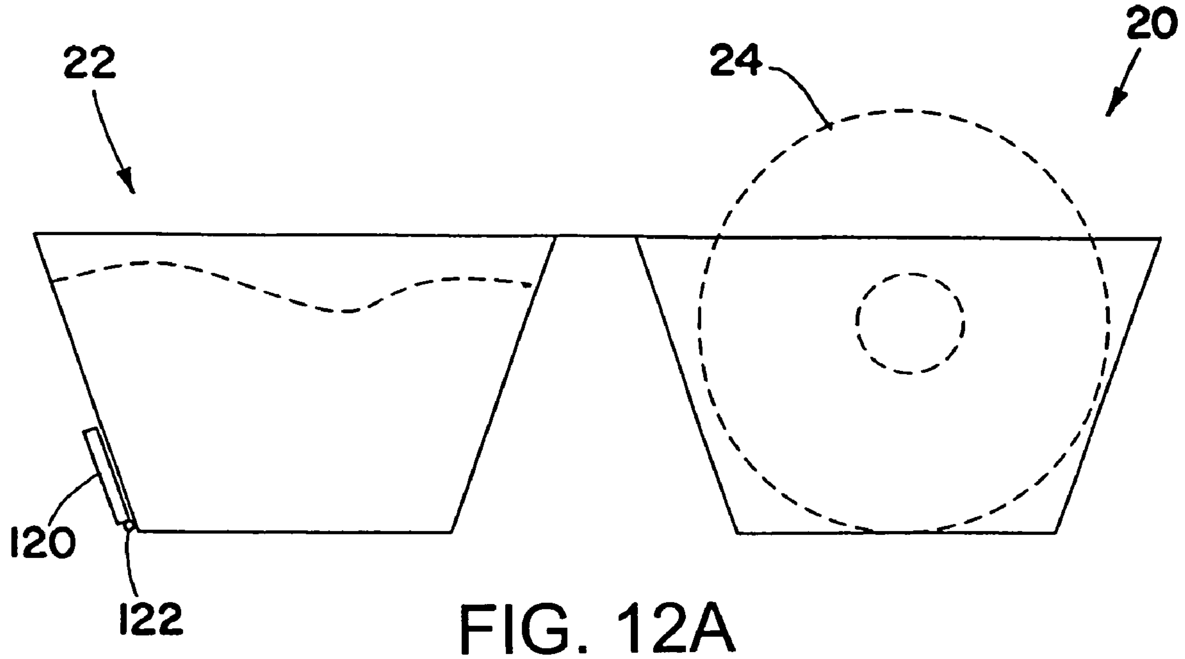
FIGS. 12A-12B illustrate side and front views of a dispenser in accordance with another embodiment of the invention.
Figure 12B:
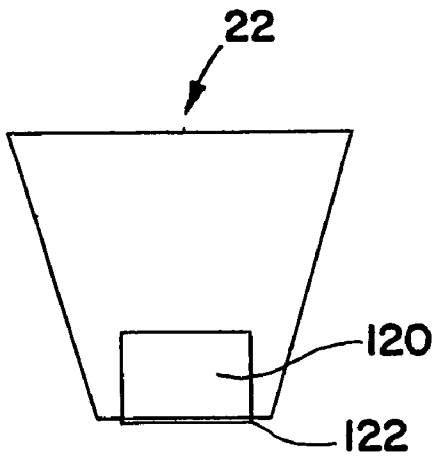

Referring now to FIGS. 12A-12B, a side view and a front view of a third embodiment of the dispenser 100' in accordance with the present invention is illustrated. The dispenser 100' is substantially the same as the dispenser 100 of FIGS. 7-11. However, the dispenser 100' includes a retractable extension or platform 120 located at or near the third elongated slot 106. The platform 120 provides a surface for grasping or holding the tape 24 as the tape is cut or torn from the dispenser 100'. The platform 120 can be coupled to the dispenser 100' via a rotatable hinge 122 or the like, such that the extension 120 may be placed in a retracted position or in an extended position. Alternatively, an elastic member, such as an elastic hinge or the like, may be utilized to attached the platform 120 to the dispenser 100'. Further, the platform 120 may be detachable from the dispenser, such that the platform 120 can be easily removed and attached from the dispenser 100'.

Figure 13A:
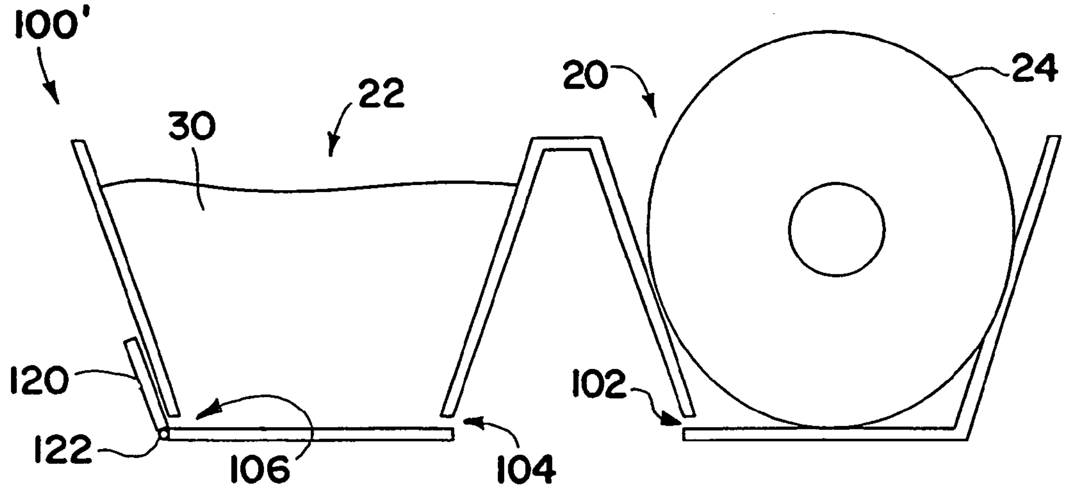
FIGS. 13A and 13B are sectional views of the dispenser of FIGS. 12A and 12B showing the platform in the retracted and extended position.
Figure 13B:
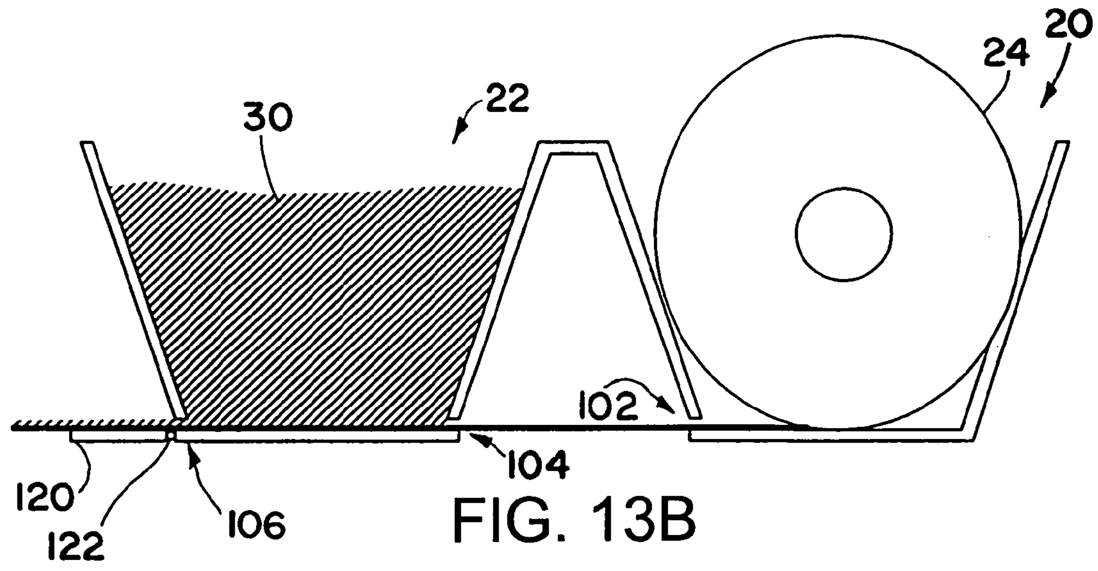
Figure 14:
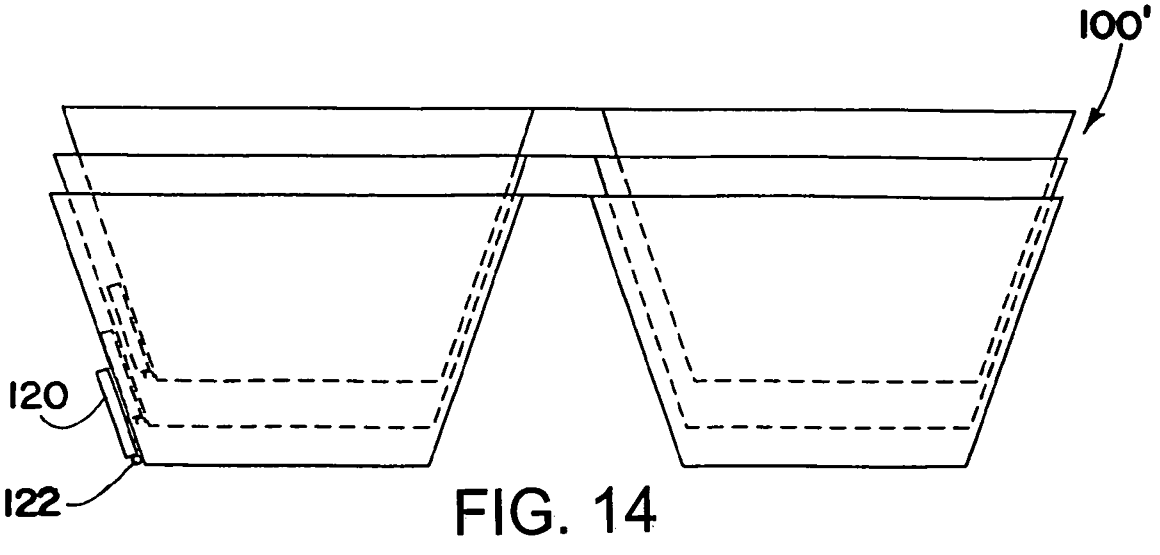
FIG. 14 illustrates dispensers according to FIG. 12A stacked on one another in a nesting configuration.

FIGS. 13A and 13B are cross sectional views of the dispenser 100', illustrating the platform 120 in the retracted position (FIG. 13A) and the extended position (FIG. 13B). Typically, the platform 120 is in the retracted position when the dispensers 100' are stacked in a nesting configuration, as shown in FIGS. 13A and 14, and in the extended position during normal use, as shown in FIG. 13B. The platform 120 can have any shape desired, although it is preferable that the shape of the platform does not inhibit the nesting feature of the dispenser 100'.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A stackable drywall tape and joint compound dispenser, comprising:

a tape holder;

a first receptacle having an input configured to receive drywall joint compound; and an input port arranged in the first receptacle and configured to receive tape dispensed from the tape holder, wherein when the dispenser is placed on another dispenser of substantially the same configuration, the respective tape holders and first receptacles nest within one another.

2. The dispenser of claim 1, wherein at least one of the tape holder and first receptacle are tapered such that an upper region of the tape holder or first receptacle is wider than a lower region the tape holder or first receptacle.

3. The dispenser of claim 1, wherein an angle formed between a floor of the tape holder and/or first receptacle and a wall of the respective tape holder and/or first receptacle is obtuse.

4. The dispenser of claim 1, wherein at least one of the tape holder and first receptacle has a frusto-pyramidal shape.

5. The dispenser of claim 1, wherein a configuration of the tape holder is different from a configuration of the first receptacle.

6. The dispenser of claim 1, wherein the tape holder comprises an arm coupled to the dispenser, said arm including a spool for accepting the tape.

7. The dispenser of claim 1, wherein the tape holder and first receptacle are formed having rectilinear or curvilinear shapes.

8. The dispenser of claim 1, wherein the first receptacle comprises:

an output port configured to dispense tape coated with joint compound, wherein at least one of the input port and the output port is arranged so as to inhibit leakage of joint compound from the first receptacle.

9. The dispenser of claim 8, wherein at least one of the input port and the output port follows a contour of the first receptacle.

10. The dispenser of claim 1, wherein the dispenser is a one-piece unit.

11. The dispenser of claim 1, wherein the dispenser has no moving parts.

12. The dispenser of claim 1, further comprising a channel that guides the tape through a pre-determined path within the dispenser.

13. The dispenser of claim 1, wherein the dispenser is a multi-piece dispenser comprising a body and a base, said base selectively couplable to said body.

14. The dispenser of claim 13, further comprising a selectively operable retainer for coupling the base to the body.

15. The dispenser of claim 1, further comprising a cutting edge for cutting the drywall tape.

16. The dispenser of claim 15, wherein the cutting edge is a sharp or serrated edge.

17. The dispenser according to claim 1, wherein the first receptacle is formed integral with the tape holder.

18. The dispenser according to claim 1, wherein the tape holder comprises a second receptacle.

19. The dispenser according to claim 18, wherein the second receptacle comprises:

an input configured to receive tape; and an output port configured to dispense tape from the second receptacle.

20. The dispenser according to claim 18, wherein the input port and the output port form a channel that guides tape dispensed from the output port into the input port.

21. The dispenser according to claim 1, wherein the input port comprises an opening that forces tape received by the input port to pass along a bottom area of the first receptacle.

22. A stackable drywall tape and joint compound dispenser, comprising:

a tape holder; and a reservoir for storing drywall joint compound, wherein when the dispenser is placed on another dispenser of substantially the same configuration, at least one of the respective tape holders and reservoirs nest with one another, further comprising a selectively retractable platform coupled to the dispenser.

23. The dispenser of claim 22, wherein the platform is coupled to the dispenser via a hinge.

24. The dispenser of claim 23, wherein the hinge is at least one of a rotatable hinge or an elastic hinge.

25. The dispenser of claim 22, wherein the platform is detachable from the dispenser.

* * * * *